Figure 1:
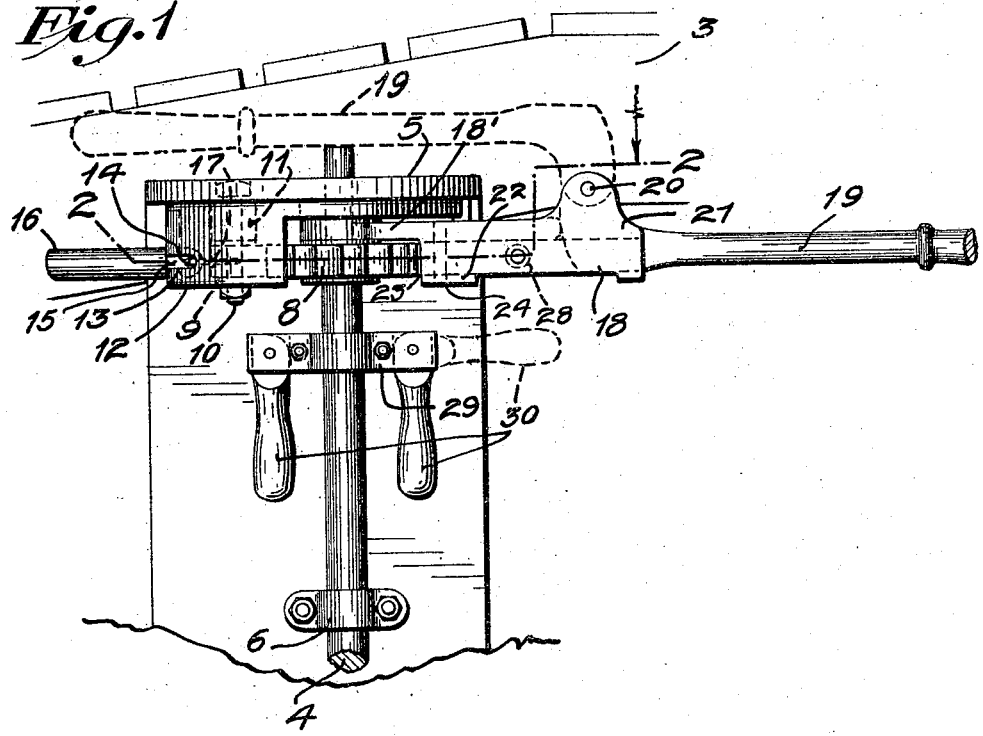

Sept. 16, 1924.  H. M. ROBERTSON  1,508,412

BRAKE ACTUATING MECHANISM

Filed Aug. 22, 1923

Inventor
Henry M. Robertson
By his Attorneys

Patented Sept. 16, 1924.

1,508,412

UNITED STATES PATENT OFFICE.

HENRY M. ROBERTSON, OF ST. PAUL, MINNESOTA.

BRAKE-ACTUATING MECHANISM.

Application filed August 22, 1923. Serial No. 658,716.

*To all whom it may concern:*

Be it known that I, HENRY M. ROBERTSON, a citizen of the United States, residing at St. Paul, in the county of Ramsey and State of Minnesota, have invented certain new and useful Improvements in Brake-Actuating Mechanism; and I do hereby declare the following to be a full, clear, and exact description of the invention, such as will enable others skilled in the art to which it appertains to make and use the same.

My present invention relates to car brake actuating mechanism and is in the nature of a refinement of or improvement on the brake actuating mechanism disclosed and broadly claimed in my prior Patent No. 1,330,282, of date February 10, 1920. That the reader may come to a quick understanding of the type of brake actuating mechanism here involved, the following quotation from the introductory paragraphs of my prior patent is here repeated, towit:

"In car brake actuating mechanism, as hither designed, it has been customary practice to provide the brake staff upon which the brake chain is wound, with a ratchet wheel and to provide a manually operated retaining dog for operation on its ratchet wheel to hold the brakes set. In some of the hitherto used brake actuating mechanisms, the brake staff has been provided with a hand wheel, and in others, a lever and pawl and ratchet device has been provided for rotating the brake staff, but in all instances, so far as I am aware, to release the said brakes it has been necessary by manual operation either with the foot or with the hand, to release the retaining dog at a time and while the hands of the operator are used on the brake wheel or lever, exerting a force thereon sufficient to relieve the retaining dog in the brake setting pressure. Otherwise stated, the brake set pressure on the retaining dog prevents the same from being released, solely either by the hand or foot, and hence, two operations must be performed at once, towit: the brake pressure must be relieved by the hands and the retaining dog by the foot. These two operations are, at least, very difficult to perform in all arrangements of the brake actuating mechanism, and in some arrangements, it is exceedingly difficult and practically impossible to simultaneously perform the two operations.

"My improved brake actuating mechanism involves, particularly, two radically new features of improvements, towit: first, an improved form of lever and ratchet mechanism for rotating the brake staff, and second, an arrangement of the retaining dog and the co-operative releasing devices, whereby, in advance of the application of power to the set brakes, to release the same, the retaining dog may be so set that it will automatically release itself later on, or in a subsequent instant when the ratchet mechanism of the lever is automatically released by a predetermined movement of the brake lever."

Brake mechanism of this type is adapted for application to various different kinds of cars. For instance, it is applicable to flat cars adapted to carry logs or other loads, making it necessary to place the entire brake actuating mechanism very low down. The brake actuating mechanism is also especially adapted for application to the ends of box cars, where a projection of the brake actuating mechanism above the tops of the cars is not permitted nor desirable; and it is this latter noted application of the present improved brake actuating mechanism that is illustrated in the drawings.

Figure 2:
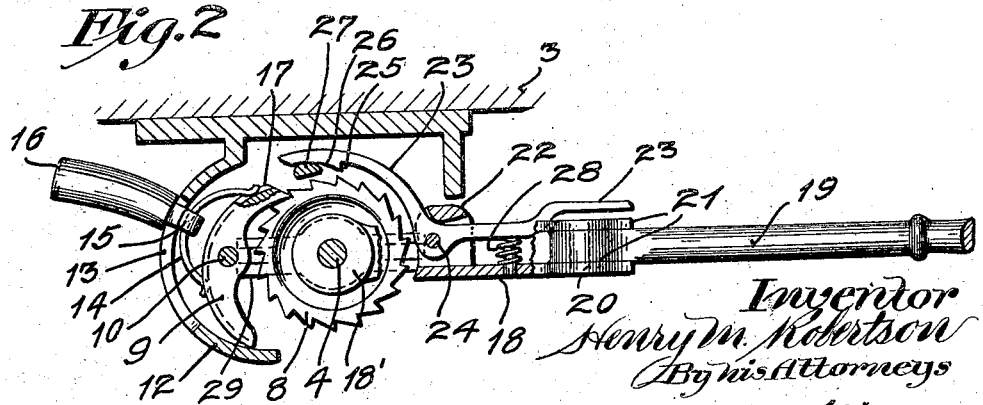

Referring to the drawings, wherein like characters indicate like parts throughout the several views, Fig. 1 is a fragmentary end elevation of a box car showing my improved brake actuating mechanism applied thereto; and Fig. 2 is a horizontal section taken approximately on the line 2—2 of Fig. 1.

The body of the box car is indicated by the numeral 3. A brake staff 4 is shown as applied in a vertical position to one end of the car body, being journaled at its upper portion in an approximately horizontal bearing plate 5 rigidly anchored to the end of the car body. Also, the staff 4 is shown as extended through a small bearing 6 suitably secured on the car body a considerable distance below the bearing table 5. At its lower end, the staff 4 will be equipped with the customary chain winding portion affording a windlass drum to which a brake chain will be attached in the customary and well known manner.

A short distance below the bearing plate 5, the staff 4 has rigidly secured thereto a ratchet wheel 8 that is arranged to be engaged by a retaining dog 9, that is intermediately pivoted to the plate 5 by a nutequipped bolt 10 that is passed through the plate 5 and a depending hub 11 of the latter.

The bearing plate 5 has a depending segmental flange 12 that extends just outward of and about half-way around the dog 9 and is provided with a segmental slot 13. For action on the retaining dog 9, I provide a dog-actuating spring 14 and a spring-shifting device. This spring 14 is preferably of substantially semi-circular form, or, in other words, is in the form of a bow, and at its intermediate portion it is rigidly secured to a shank 15 that works slidably in the segmental slot 13 and is provided at the exterior of the flange 12 with a hand piece 16. The free ends of the spring bow 14 engage a channel 17 formed in the back of the dog 9 and extended longitudinally thereof. The relation of these parts just described will appear in the description of the operation.

A brake lever 18, which, in itself, is preferably a short member, extends radially from the ratchet wheel 8 with its main body portion aligned therewith but provided at its inner end with a flattened portion 18' that is pivoted on the staff 4 just above said ratchet wheel. This lever 18 has a supplemental extension or hand portion 19 that is hinged thereto at 20 for vertical movements and which, when turned horizontally outward, lies between spaced flanges 21 of said main lever 18.

Adjacent to the ratchet wheel 8, the lever 18 is provided with a bifurcated lug 22 to which a long ratchet dog 23 is intermediately pivoted at 24. At its inner end, the dog 23 has a ratchet lug or tooth 25 and a beveled cam surface 26, which latter is engageable with a fixed cam-acting releasing abutment 27 rigidly secured to and depending from the bearing plate 5. The outer end of the dog 23 is spaced from but terminates approximately coincident with the outer end of the lever 18 where it may be engaged by the pressure of the hand holding the lever. A light coiled spring 28, compressed between the lever 18 and the outer portion of the dog 23, tends to render said dog operative on the ratchet wheel 8.

Rigidly clamped to the staff 4, a short distance below the ratchet wheel 8, is a short bar 29, to the ends of which lever-acting hand pieces 30 are pivoted for vertical movements. Preferably and as shown, said hand pieces 30 are arranged to work in bifurcated ends of the bar 29.

*Operation.*

Briefly summarized, the operation of the brake actuating device above described is as follows:

When there is considerable slack in the brake chain and connections, the slack may be quickly taken up by turning out and using the hand pieces 30 one after the other, thereby quickly rotating the staff 4. The hand pieces 30, when turned outward, afford levers of considerable length, but when released, they drop by gravity, so that they will clear the end of the car. Obviously, good construction demands that the staff 4 be located so close to the end of the car that there would not be sufficient clearance for levers of the length afforded by the outturned hand pieces.

For great power in setting the brakes, the lever extension or hand piece 19 will be turned outward as shown by full lines in Figs. 1 and 2, and this lever may be then operated either by one or two hands. The brakeman, in operating the device, of course, will stand on the customary brake step provided on the end of the car but not shown in the drawing.

For setting of the brakes, the spring bow 14 will be set as best shown in Fig. 2 and will then render the retaining dog 9 operative on the ratchet wheel 8. In setting the brakes, the main lever will be oscillated to produce a ratchet action between the dog 23 and the ratchet wheel 8, but return strokes can be short of the position in which the beveled cam end 26 of the dog 23 will be engaged with the releasing abutment 27; but even if the return movements should be such as to engage the dog 23 with the abutment 27, no harm would be done because the retaining dog will hold the ratchet wheel with the brakes set.

After the brakes have been set and when it is desirable to release the same, the operator first shifts the hand piece 16 to the outer extremity of the slot 13, thereby carrying the spring bow 14 to a position in which it will tend to release the retaining dog 9 from the ratchet wheel, but such release will not take place while said retaining dog is subject to the brake-setting pressure. However, when the operator, by a slight movement of the main lever tending to set the brakes still slightly harder, the retaining dog will be released from pressure from the ratchet wheel and the spring 14 will then immediately throw the said retaining dog into a releasing postion; and then, when the main lever is permitted to move in a brake-releasing position far enough to engage the cam end 26 of the dog 23 with the abutment 27, said dog will be positively released from the ratchet wheel and the brakes will thus be instantly released and the brake chain will be permitted to unwind.

Car brakes frequently have a tendency to drag or scrape against the car wheels, even when released. The chief purpose of the levers or hand pieces 30 is to afford means for giving ample slack to the chains and brake-actuating connections, so as to insure full or complete release of the brakes.

By pressure on the outer end of the driving dog 23, said dog may at any time be moved and held in an inoperative position, and said dog may be thus released by the same hand that operates the main lever and the other hand can be then used to positively move the staff 4 in a chain-unwinding and brake-releasing position by manipulation of the hand pieces 30.

In the manipulation of car brakes, it is frequently desirable, when the brakes are set under exceedingly high pressure, to materially reduce the brake-setting pressure without releasing the brakes. With the brake mechanism described, which includes the manually releasable dog 23, this may be easily accomplished as follows: While the brakes are held set by the retaining dog 9, the dog 23 may be released from the ratchet wheel 8 and moved outward or in a clockwise direction in respect to Fig. 2 and then re-engaged with said ratchet wheel while thus turned outward. Then, by first moving the lever 19 slightly outward to relieve the retaining dog from brake-setting pressure, said dog will be temporarily released from the ratchet wheel, then the main lever moved inward or in an anti-clockwise direction so as to somewhat relieve the brake-setting pressure but without engaging the free end of the dog 23 with the tripping abutment 27, and then by re-engagement of the retaining dog 9 with the ratchet wheel 8, the brakes will be still held set but under reduced pressure. Of course, this brake-setting pressure, by repeated operations, may be reduced as much as desirable.

When the lever extension or handle 19 is turned into its folded position shown by dotted lines in Fig. 1, it will be out of the way and the main lever 18 may then be used where great power is not required to more quickly move the ratchet wheel and staff than when the extended main lever is used.

What I claim is:

1. In a brake actuating mechanism, a brake staff equipped with a ratchet wheel, a lever pivotally associated with said staff and provided with a driving dog normally operative on said ratchet wheel but having an outwardly projecting end exposed along the same where it may be engaged to move said dog into an inoperative position, a cam-acting tripping abutment operative on the inner end of said driving dog to release the same from said ratchet wheel when said lever is moved to an extreme return position, and a retaining dog operative on said ratchet wheel.

2. The structure defined in claim 1 in which the outer end of said driving dog terminates in the vicinity of the outer end of said lever and in further combination with a handle pivotally connected to said lever and affording an extension thereof when turned outward and which handle is adapted to be turned inward to a folded position overlying said ratchet wheel.

3. The structure defined in claim 1 in which said lever adjacent to said ratchet wheel is provided with a bifurcated lug through which said driving dog is extended and to which said dog is pivoted, and in further combination with a handle pivoted to said lever and adapted to be turned outward to form a lever extension and to be turned inward to a folded position above said ratchet wheel.

4. In a brake mechanism, the combination with a brake staff carrying a ratchet wheel, and a dog-equipped lever co-operating with said ratchet wheel, of a retaining dog having a curved outer portion, a support to which said retaining dog is intermediately pivoted for coaction with said ratchet wheel, and a yielding releasing device for said retaining dog comprising a hand piece shiftable on said support and provided with a bow spring, both ends of which slidably engage the curved outer portion of said retaining dog, and which spring is shiftable from one position in which it renders said retaining dog operative into another position in which it tends to render said dog inoperative, and which ratchet dog on its curved outer portion has a longitudinal channel in which the ends of said bow spring are slidably engaged.

5. The combination with a brake mechanism support and a brake staff journaled thereto, of a short bar rigidly secured to said staff and projecting in opposite directions radially therefrom and rotatable therewith clear of said support, and hand pieces pivoted to the ends of said bar and adapted to clear said support only when turned downward to inoperative positions, but adapted to be turned outwardly one after the other to rotate said staff.

In testimony whereof I affix my signature.

HENRY M. ROBERTSON.